(12) United States Patent
Brune

(10) Patent No.: US 6,319,451 B1
(45) Date of Patent: *Nov. 20, 2001

(54) METHOD OF MOLDING A LAYER AROUND A BODY

(75) Inventor: Gary J. Brune, Lakeville, MA (US)

(73) Assignee: Acushnet Company, Fairhaven, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,153

(22) Filed: Dec. 17, 1998

(51) Int. Cl.$^7$ .................................................. B29C 45/14
(52) U.S. Cl. ..................... 264/278; 264/275; 264/279.1; 264/294; 264/328.7; 425/112; 425/129.1
(58) Field of Search ...................... 264/278, 279.1, 264/294, 328.7, 275; 425/112, 129.1

(56) References Cited

U.S. PATENT DOCUMENTS

| 3,016,574 | | 1/1962 | Fischer et al. ............................ 18/30 |
| 3,068,522 | * | 12/1962 | Nickerson et al. ........................ 18/36 |
| 3,177,280 | * | 4/1965 | Ford et al. ............................ 264/275 |
| 3,787,159 | * | 1/1974 | Bielfeldt ................................ 425/167 |
| 4,501,715 | | 2/1985 | Barfield et al. ........................ 264/248 |
| 5,059,364 | * | 10/1991 | Okubo et al. .......................... 264/40.1 |
| 5,147,657 | | 9/1992 | Giza ...................................... 425/117 |
| 5,221,509 | * | 6/1993 | Fujimoto et al. ................... 264/328.7 |
| 5,415,817 | | 5/1995 | Shiao et al. ............................. 264/2.2 |
| 5,424,017 | * | 6/1995 | Hinduja et al. ........................ 264/163 |
| 5,798,071 | * | 8/1998 | Boehm ................................... 264/275 |
| 5,945,047 | * | 8/1999 | Yukihiro et al. ..................... 264/40.5 |

OTHER PUBLICATIONS

"Coining" in Injection Molding Handbook, 2nd ed. pp. 1005–1006, 1995.*

* cited by examiner

Primary Examiner—Jan H. Silbaugh
Assistant Examiner—Edmund H. Lee
(74) Attorney, Agent, or Firm—Pennie & Edmonds LLP

(57) ABSTRACT

A method of molding a layer around a body within a mold, in which the body is positioned within a mold cavity defined by opposing mold portions of the mold, to leave a cavity space between the body and the mold portions at least partially surrounding the body. Layer material is injected into the cavity space around the body when the mold portions are in a partially open position. The mold portions are compressed towards each other to a compression molding position to compression mold the layer material around the body.

20 Claims, 7 Drawing Sheets

METHOD OF MOLDING A LAYER AROUND A BODY

BACKGROUND OF THE INVENTION

Golf balls are typically comprised of a cover that is injection molded or compression molded around a golf ball core and which may include one or more wound or solid layers and also a liquid or solid center. Also, the individual layers within the cover are generally either compression or injection molded.

Injection molding is generally conducted between two mold halves that together define a mold cavity in which the core is supported with fixed or retractable pins. In some processes, such as disclosed in U.S. Pat. No. 5,147,657, the support pins are retractable. Resinous cover material is injected at high pressures into the mold cavity, around the core. The retractable pins are withdrawn from the cover material when it is solid enough to support the core, yet soft enough to fill pin holes remaining where the pins once were as further material is injected.

Injection molding methods are conducted with the mold closed. Injection molding generally takes place with plastic pressures upwards of about 12,000 psi. These high pressures tend to deform the golf ball core by compressing portions thereof which are disposed adjacent the injection ports, causing portions of the core disposed away from the ports to extend. Also, injection molding equipment typically includes extremely small vents through which air contained within the mold cavity may exit as molding material is injected. The very limited venting speed achievable through these vents can limit the injection speed of the cover material or layer material.

Generally, the injected material is injected from more than one port around the core to speed the injection process. Where material flowing from the various ports meet, weld lines, or knit lines, can be formed, resulting in discontinuities and residual stresses across the weld lines. This produces poor finishes with poor definition of features that are molded into the layer or cover, such as dimples. Golf ball material failures also tend to occur at the weld lines after repeated use of the golf ball.

In addition, due to friction between the injected material and the mold cavity and core, the material catches at various locations on the mold halves and core during its injection, creating more internal stresses and further decreasing the homogeneity of the molded material. These stresses also tend to produce lower quality finishes and areas that are more prone to structural failure.

As shown in U.S. Pat. No. 4,501,715, covers have also been compression molded about golf ball cores. In this technique, previously molded hemispheres are placed around a core to form a shell. The assembly is then placed between two compression mold halves, which are then heated and pressed together. The shells are often thickest at their deepest point to enhance good surface formation and evacuation of entrapped gases.

In compression molding, neither pins or injection ports or gates are required, and details on the molded product, such as dimples, are generally visually significantly sharper than those resulting from injection molding. Compression molding, however, does necessitate the added step of molding the half shells before they are compression molded around the core. In addition, the finished half shells must be pre-aligned within the compression mold halves by hand or by machine, and a weak point results at the parting line where the material from the two shells has melted and flowed together.

SUMMARY OF THE INVENTION

The invention provides fast cycles for molding a layer around a body, preferably a golf ball core, with the finish quality of compression molding. Although this invention may be employed to mold any layer about a body, in the field of golf balls this layer may be a cover, for instance, or a mantle layer within the golf ball core, where the internal body comprises one or more inner layers of the core.

Layer material is injected around the body within a mold cavity that is formed by injection mold portions. The layer material is injected when the mold portions are partially open, leaving a space therebetween. This space allows air to vent at a rapid rate from the cavity and permits the rapid injection of the layer material into the cavity and thus short cavity fill times. The mold portions are preferably moved from an initial closed position to their partially open position by the pressure created within the mold cavity by the injected layer material.

The mold portions are then closed together to compression mold the layer material about the body. In addition, the compression molding improves packing of the material into the minute shape-features of the mold cavity, producing a sharper finish of the molded product.

DETAILED DESCRIPTION OF THE PREFERRED EMBODIMENTS

Figure 1:
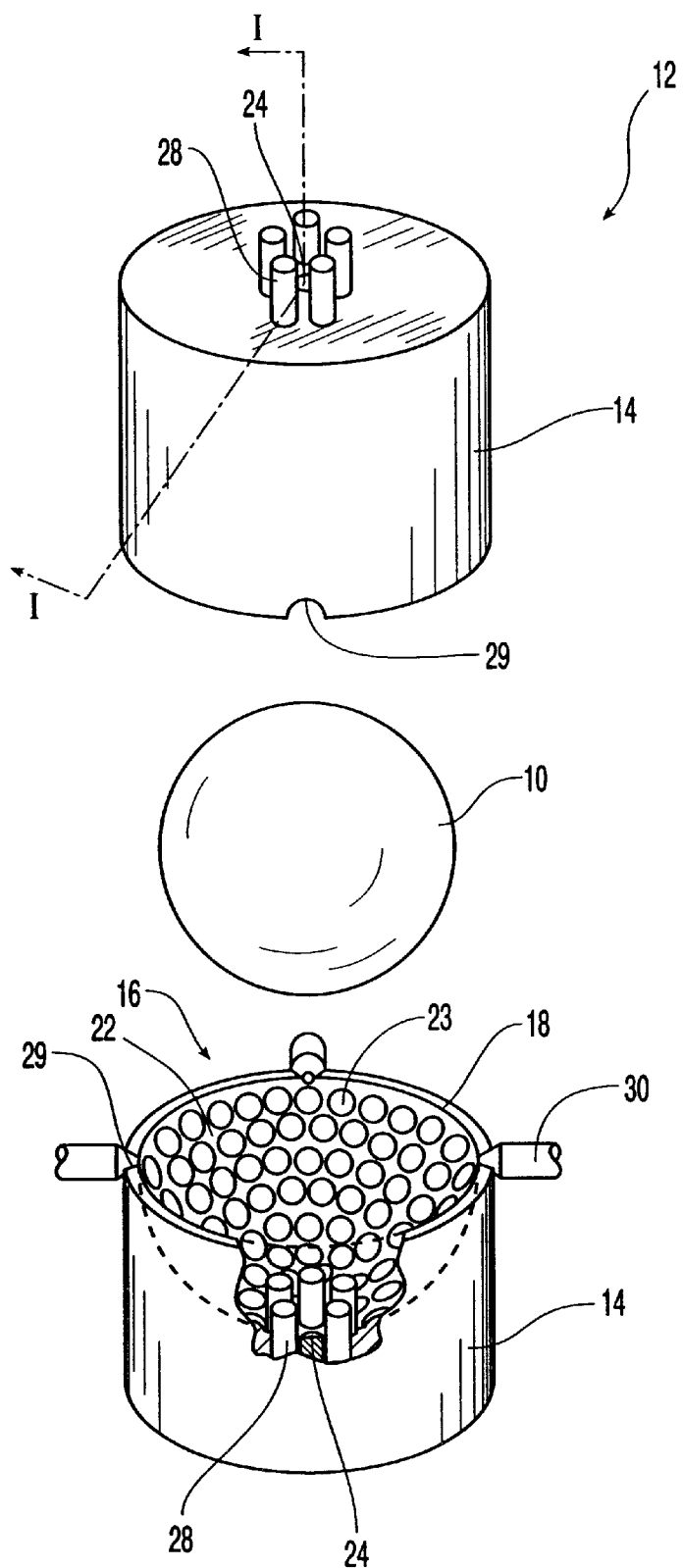
FIG. 1 is a perspective view of an open mold constructed according to the invention.
Figure 2:
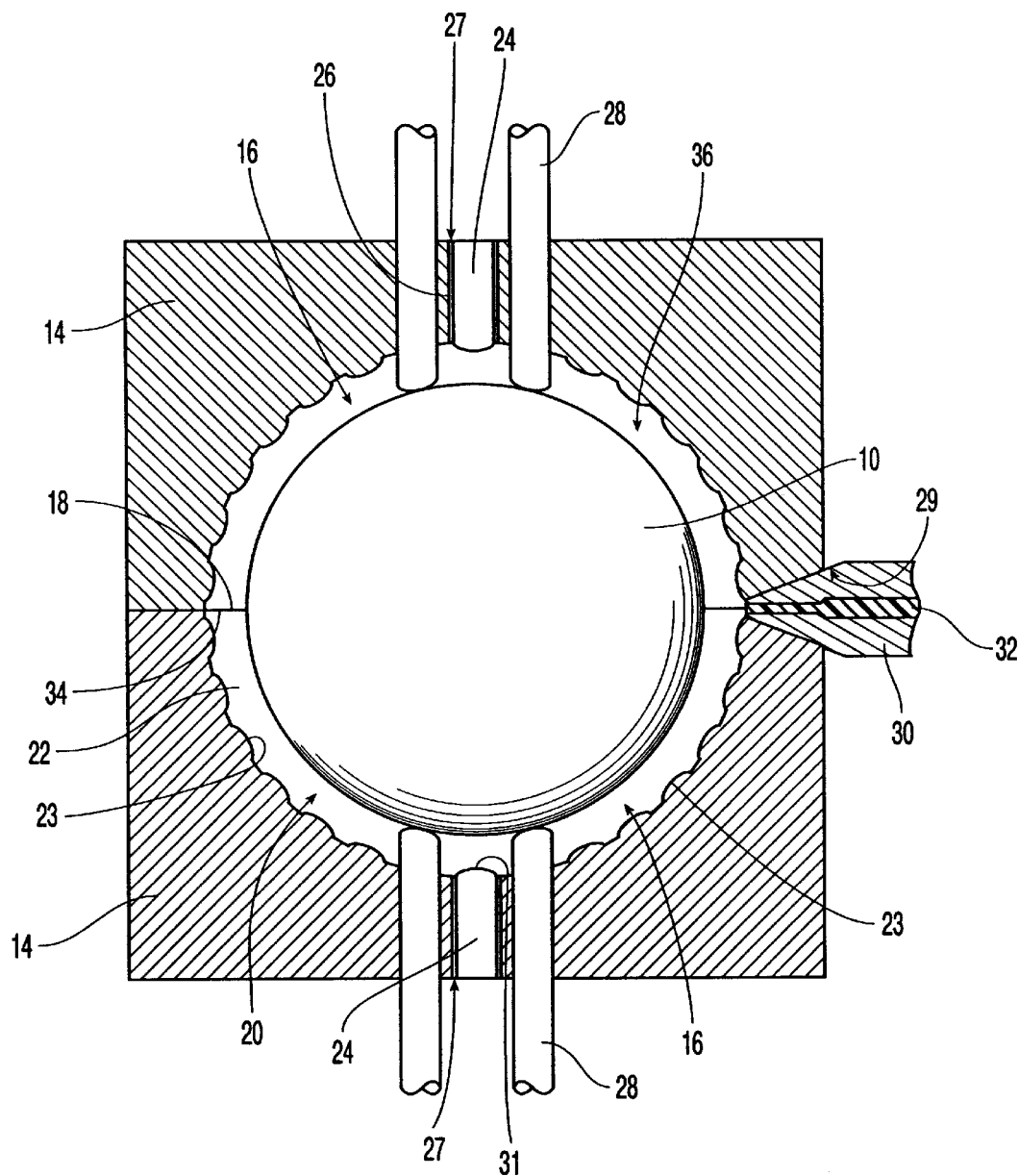
FIG. 2 is a diagrammatical cross-sectional view of the mold in a closed position.

Referring to FIGS. 1 and 2, a body, which is a golf ball core 10 in the preferred embodiment, is placed into a mold 12. The mold 12 includes opposing mold portions, defined by two mold halves 14. Each mold half 14, in turn, defines a corresponding substantially hemispherical cavity 16 and has a mating surface 18 surrounding the hemispherical cavity 16 and facing the opposing mold half 14. When the mold halves 14 are brought together with the mating surfaces 18 in full contact with each other, the two hemispherical cavities 16 together define a substantially spherical mold cavity 20. Inner surfaces 22 of the mold halves 14, defining the hemispherical cavities 16, include a negative dimple pattern with a plurality of protrusions 23 that form dimples in the finished golf ball cover.

A fixed vent pin 24 extends through each mold half 14 to the edge of the mold cavity 20. The diameter of the vent pins 24 is slightly smaller than the diameter of the bores 26 which they penetrate, providing a vent 27 defined by a gap of preferably 0.0002 to 0.0005 inches formed between the vent pins 24 and the bores 26. The vent 27 thus extends through each mold half 14 to communicate the cavity 20 with the exterior for venting air from the cavity 20 during molding cycles, particularly while the mold 12 is closed. Surface 31 of the vent pins 24 face the mold cavity 20 and are preferably shaped to form a dimple in a cover molded therein.

Support pins 28 extend through each mold half 14, into the mold cavity 20. The support pins 28 are configured to support the core 10 in a predetermined position within the mold cavity 20 when the core 10 is placed against them. The preferred predetermined position is with the core 10 centered within the mold cavity 20, to produce a golf ball with a centered core. The preferred embodiment has ten parallel support pins 28, five in each mold half 14. Other types of support members may also be employed in alternative embodiments.

The mold 12 of the preferred embodiment has four injection gates 29 configured to receive injection nozzles 30. The gates 29 are preferably spaced at equal angles from each other around the mating surfaces 18. In this case, as there are four gates 29, they are spaced at about 90° from each other. When the mold 12 is closed, with the mold halves 14 fully contacting each other, the gates 29 communicate the mold cavity 20 to the exterior of the mold 12, and the nozzles 30 can seat tightly in the gates 29. Preferably, the nozzles 30 can be moved into the gates 29 after the mold halves 14 are pressed together.

The nozzles 30 are configured to inject molten layer material, which in the preferred embodiment is cover material 32. The cover material 32 is injected into the mold cavity 20 through the gates 29 at a parting line 34 where the mold halves 14 abut. The cover material 32 is heated at least to its melting point in a reservoir, and is then forced by a screw through the injection gates 29, preferably at about 12,000 psi. A hot runner system is preferably employed, where the nozzles 30 are maintained above the melting temperature of the cover material 32, while the mold is maintained below the melting temperature of the material 32. The flow of the molten cover material 32 may be positively stopped after the cavity 20 is filled, and the cover material 32 is maintained in a molten state in runners that lead to the mold cavity 20. The hot runner system reduces or eliminates any sprues attached to the molded part.

The cover material is preferably a material such as engineering type resins, including ionomer resins, such as resins manufactured by Dupont under the trade name SURLYN®, and synthetic balata, a type of polyisoprene which is among the softest of cover materials used in modern golf balls.

Referring to FIG. 2, the mold halves are held together, preferably by a hydraulic press, with a first force. Preferably, this first force is about 40 kN for a molding machine that includes four individual golf ball molds 12, although the molding machine preferably includes 4–8 mold cavities.

FIG. 2 shows the core 10 held concentrically within the mold cavity 20 by the support pins 28. As the cover material 32 is injected in to the mold cavity 20, the material 32 flows around the core 10, through a space 36 remaining between the core 10 and the inner surfaces of the mold halves 14, and air vents from the cavity 20 through vents 27.

Figure 3:
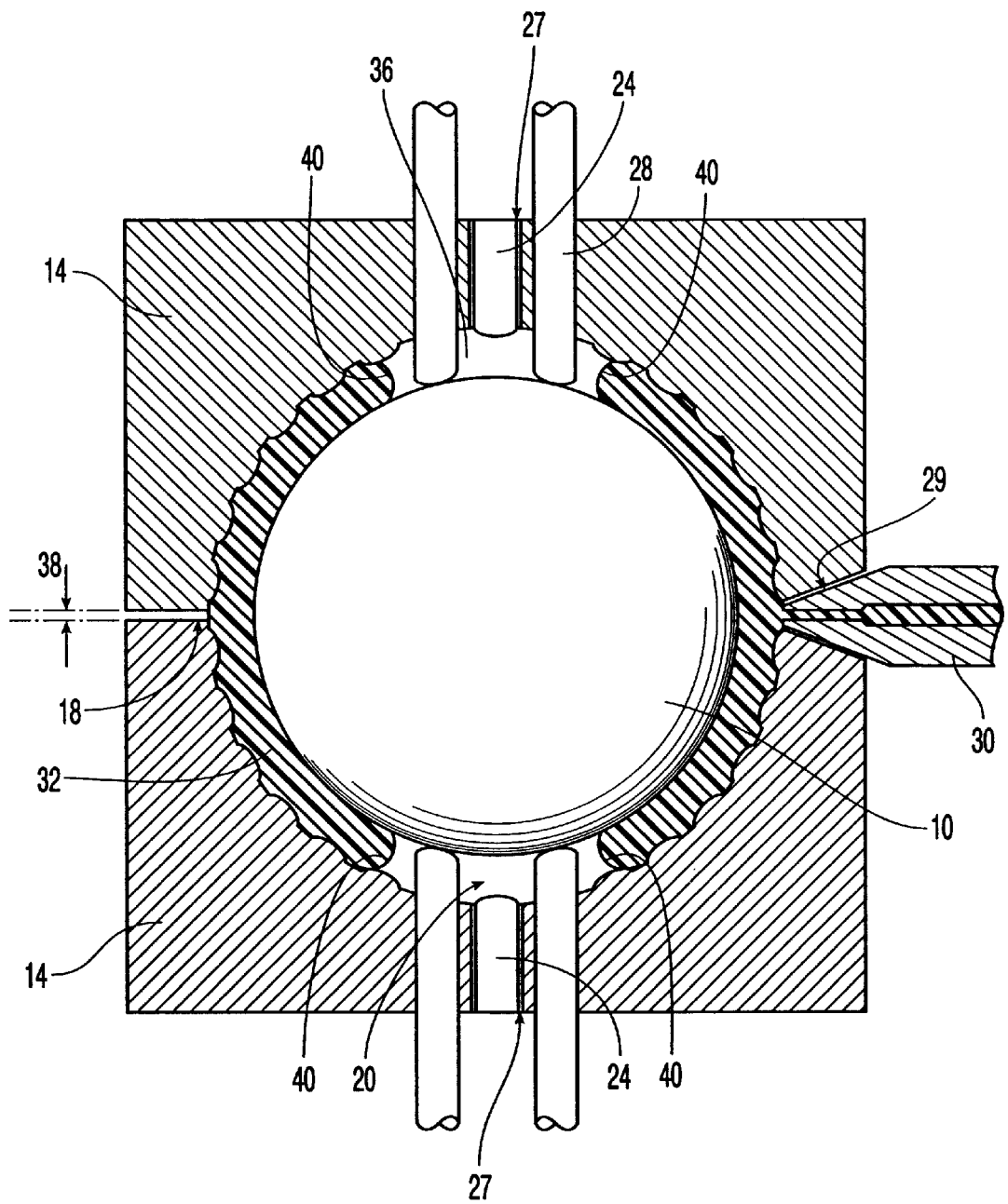
FIG. 3 is a diagrammatical cross-sectional view of the mold in a partially open position during an injection molding step.

The injecting of the cover material 32 raises the pressure within the mold cavity 20. As the pressure builds, the mold halves 14 are allowed to separate such that the mold is in a partially open position, as shown in FIG. 3. A space 38 remains between the mold halves 14 in this position. This space 38 is preferably small enough to prevent the material 32 from flashing through the space 38, thus keeping the material 32 contained within the mold cavity 20. Preferably, no extra cover material 32 is injected beyond that necessary to fill the mold when it is closed. Space 38 is preferably between about 0.0015 inches and about 0.0035 inches, and more preferably about 0.0018 inches. The space 38 allows air, but not material 32, to vent rapidly from the mold cavity 20, preventing pressures within the cavity 20 from becoming excessive and from slowing the injection process. The pressure within the cavity 20 preferably never reaches the magnitude of normal pressures reached in traditional injection molding methods, and thus allows the cover material 32 to flow more quickly.

FIG. 3 also shows cover material fronts 40 as the material 32 fills the space 36 remaining in the cavity 20. Where these fronts 40 contact each other, they form weld lines. At this stage in the molding process, as in injection molding methods, the cover material 32 is discontinuous across the weld lines.

Figure 4:
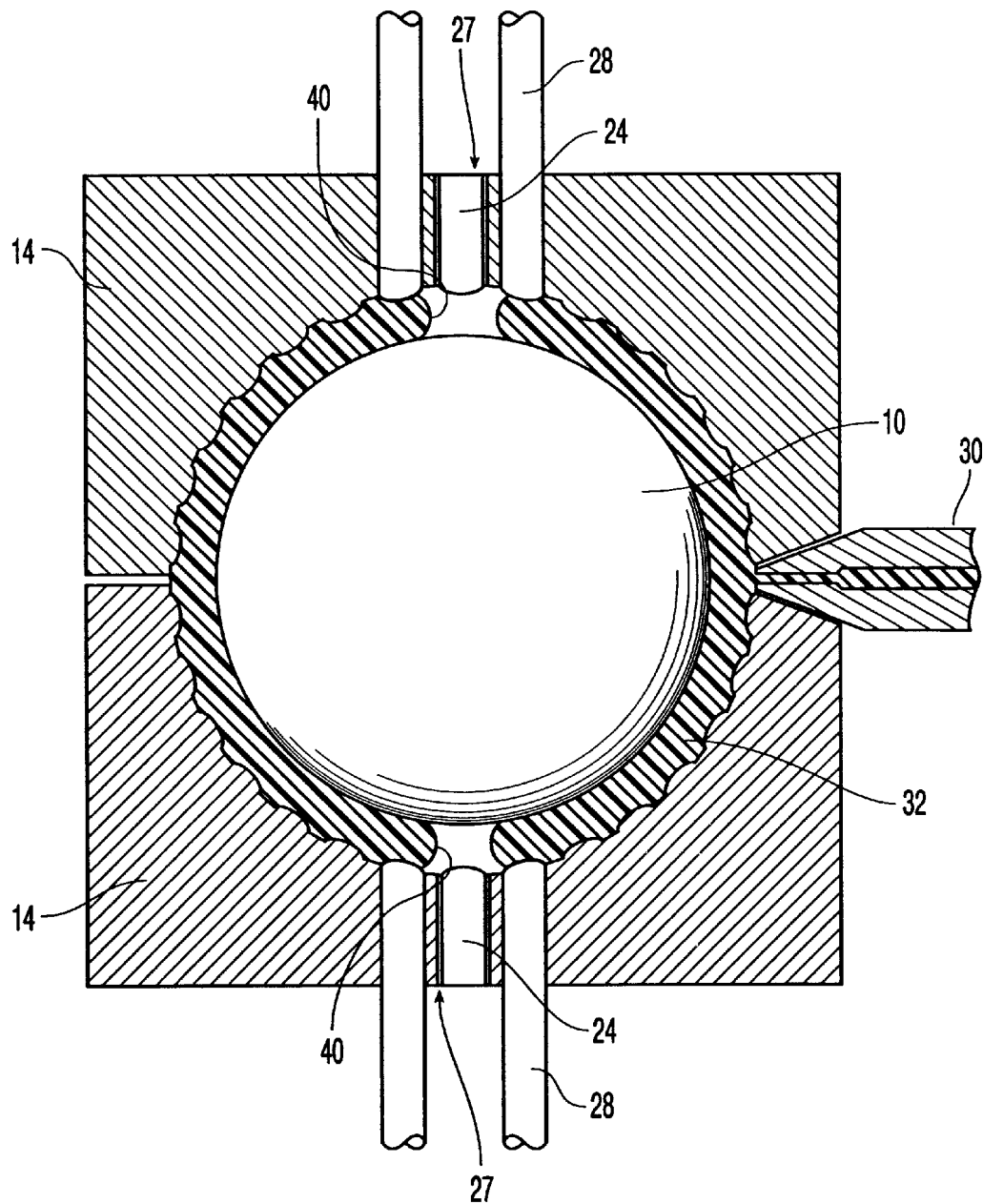
FIG. 4 is a diagrammatical cross-sectional view of the mold in the partially open position with support pins retracted.

Injection of cover material 32 is preferably continued from between the mold halves 14, with the mold 12 partially open. When sufficient cover material 32 has been injected into the mold cavity 20 to support the core 10 substantially centrally in the mold cavity 20, in the preferred predetermined position, the support pins 28 are retracted from the core 10 and the cavity 20, as shown in FIG. 4.

Figure 5:
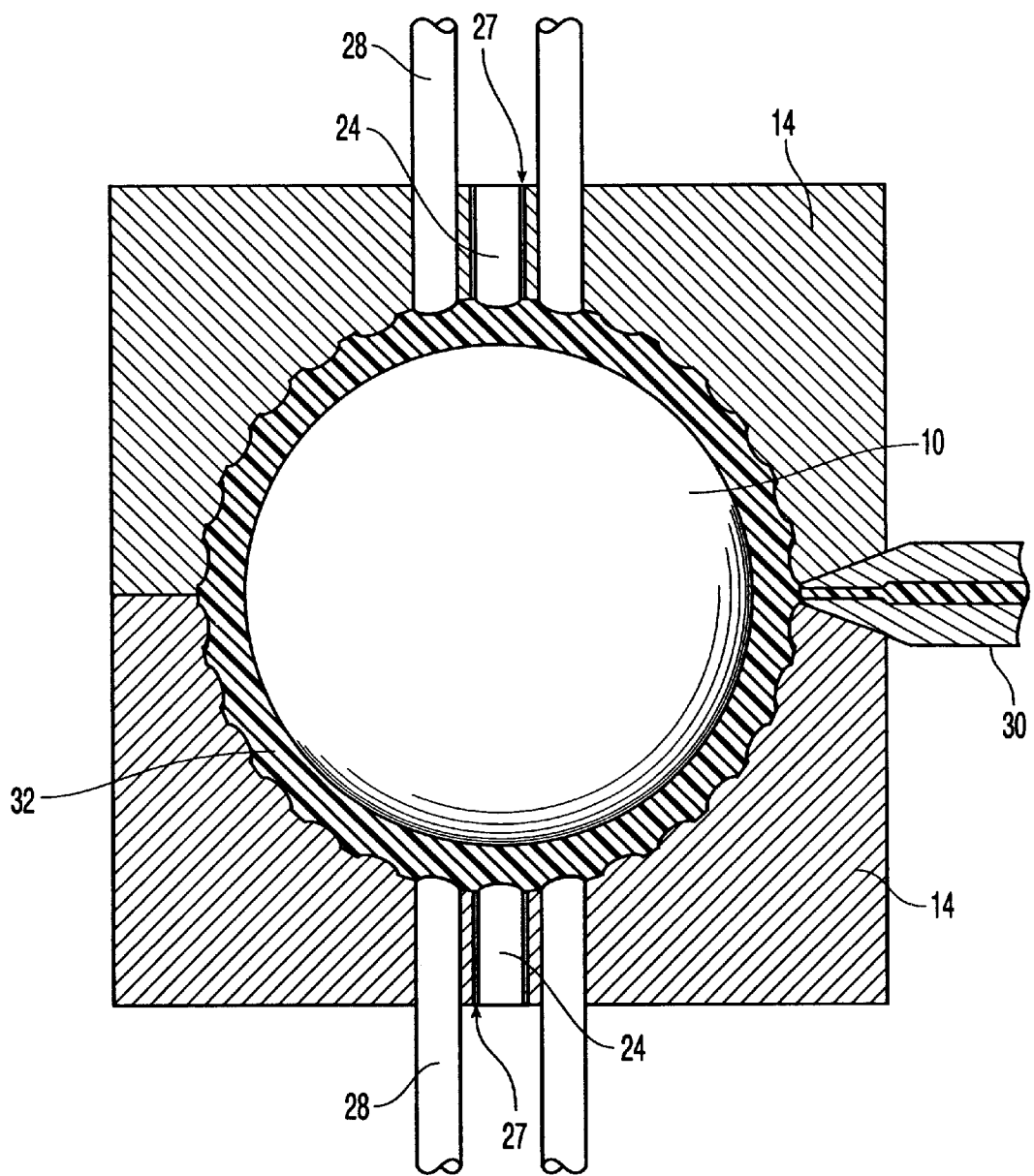
FIG. 5 is a diagrammatical cross-sectional view of the mold in a closed position after a compression molding step.

Referring to FIG. 5, the mold halves 14 are then compressed towards each other, back to the closed mold position, to compression mold the cover material 32, which is preferably still substantially in a molten state. This compression step is preferably conducted by pressurizing the hydraulic press to force the mold halves together with a force of about 80 kN. Preferably this force is at least about 50% greater than the force biasing the mold halves together during the injection of the material, and more preferably it is about twice the magnitude of the force during the injection of the material 32. The compression molding of the cover material 32 relieves a significant portion of the internal stresses therein, including those created at weld lines and by friction with the core 10 and the inner surfaces of the mold halves 14. This compression fuses the cover material 32 at weld lines and also significantly reduces imperfections in the cover material 32 as a whole and the discontinuities at the weld lines. In processes in which the support pins 28 are retracted after the material 32 has flowed around them, voids remaining where the support pins 28 had once been will be closed by the compression.

Another advantage provided by the compression step is the better packing achieved of the material 32 into the features of the mold cavity, compared to simple injection molding. For instance, the material 32 is packed more completely into corners around the protrusions 23 that form the dimples in the finished golf ball cover. This provides an improved finish to the molded product by forming sharper dimple edges.

Preferably, the compression step is commenced once the material 32 has been injected to fill at least about 40% of the cavity 20. More preferably, the cover material 32 is injected to fill at least about 50%, and most preferably at least about 80% of the cavity 20 before the compression is commenced, requiring little or no further injection of cover material 32 once the mold 12 is closed.

The mold 12 is preferably maintained at a substantially constant temperature of between about 40 and 90° F., most preferably about 50° F. This can be achieved by flowing a fluid such, as cool water, around or through passages within the mold halves 14. This temperature should be below the freezing point of the cover material 32. Thus, the material 32 begins to solidify as soon as it is injected. The golf ball can subsequently be removed from the mold 12 with a completed cover around its core 10.

Figure 6:
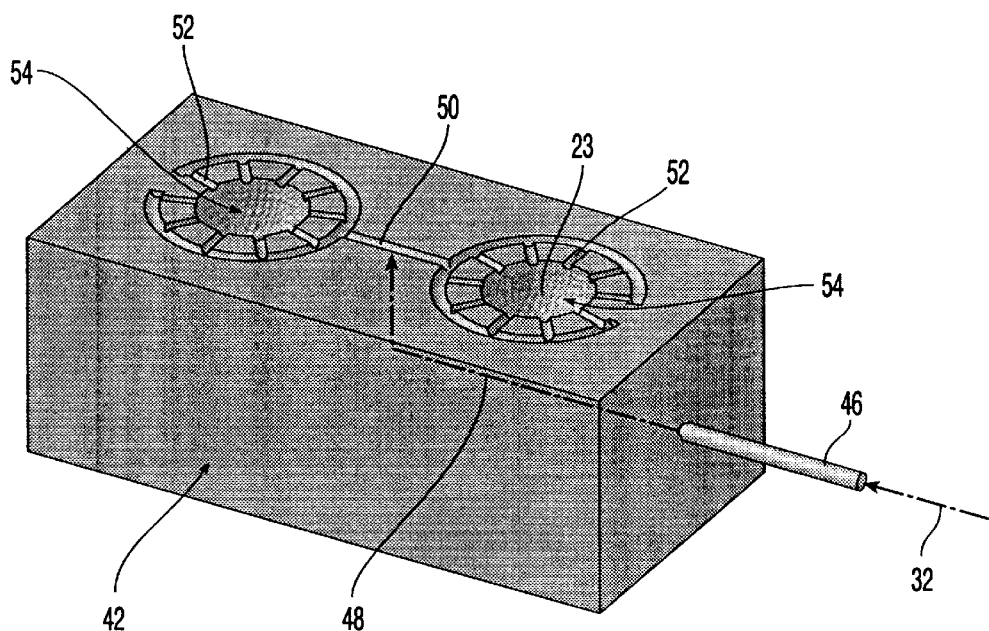
FIG. 6 is a diagrammatical perspective view of another lower mold half constructed according to the invention.
Figure 7:
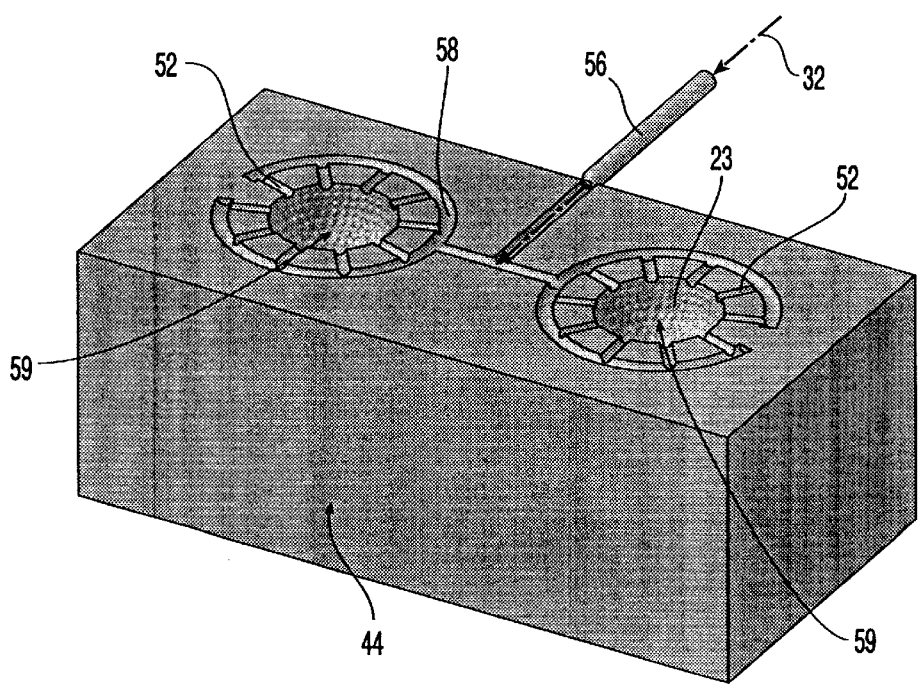
FIG. 7 is a diagrammatical perspective view of yet another lower mold half constructed according to the invention.

FIGS. 6 and 7 show a more preferred embodiment of lower mold halves 42 and 44, each for molding two covers according to the invention. The mold halves 42 and 44 are configured to mate with corresponding upper mold halves to form the cover around the cores. Mold halve 42 of FIG. 6 employs a hot-to-cold runner system, in which nozzle 46 is placed against the mold half 42 to inject cover material 32 through internal, hot runner 48 within the mold half 42 to runner 50 in the parting line between the upper and lower mold halves. Runner 50 feeds ten injection gates 52 surrounding each dimpled half-mold cavity 54.

Figure 8:
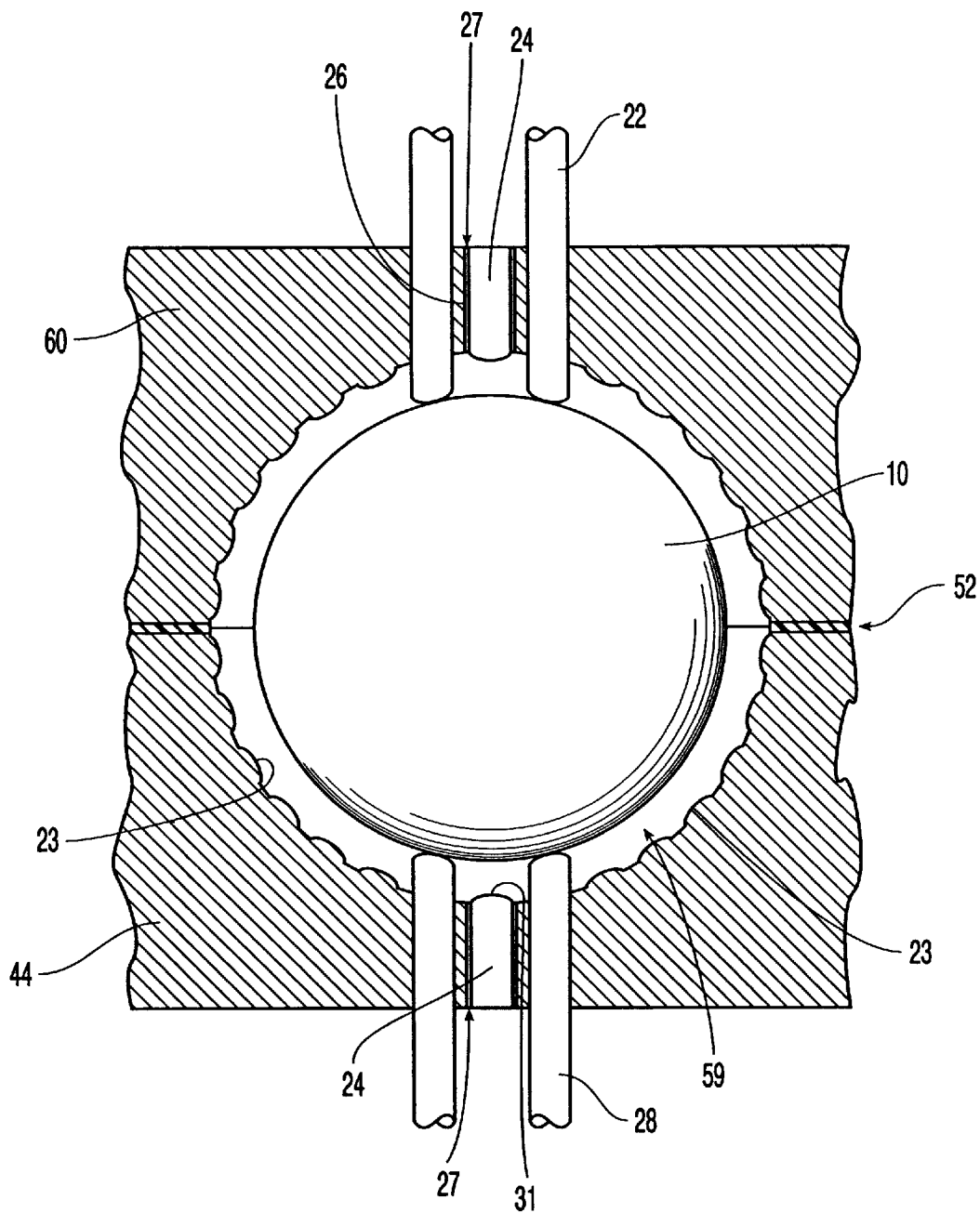
FIG. 8 is a diagrammatical cross-sectional view of the mold of FIG. 7 in a closed position.

The mold half 44 of FIG. 7 uses a cold runner system, in which nozzle 56 injects the cover material 32 directly into a runner system of runners 58 that is disposed completely in the parting line of mold during the molding process. As in mold half 42, the runners 58 lead into two mold cavities 59 with dimples 23 through gates 52. FIG. 8 shows the lower mold half 44 closed against upper mold half 60 at the start of the injection of the cover material 32 through gates 52 into the mold cavity 59, before moving the mold halves 44 and 60 to the partially open position.

As a result of the invention, residual stresses in the molded layer are reduced. The finished molded material is more homogenous than in layers that are purely injection molded around cores, and weld lines are strengthened.

With the present invention, it has been found that molded balls release better from the mold halves after the molding is complete than from similar mold halves after a pure injection molding process. Also, the time needed to inject the material is reduced by 15% when molding a golf ball cover around a core, and by 32% when molding a mantle layer around a more internal part of the core. These time reductions are primarily due to the rapid venting achieved by partially opening the mold.

Also, the adhesion of the molded layer to the body molded around is better in runs made according to the invention than in the straight injection molding. Also, better concentricity of the body within the molded layer was achieved. Furthermore, the surface produced had sharper details, improving aesthetic appearance among other things.

One of ordinary skill in the art can envision numerous variations and modifications. For example, the mold may be opened by a controlled action of the hydraulic press instead of merely by the pressure produced in the mold cavity by the injected material. Alternatively, the initial closing force produced on the mold halves can be held at about 80 kN, then reduced to about 40 kN to allow the mold 12 to partially open, and then increased again to about 80 kN to compression mold the layer material. Also the mold cavity may be held open in a fixed position until the start of the compression step. All of these and other modifications are contemplated by the true spirit and scope of the following claims.

What is claimed is:

1. A method of molding a layer around a golf ball core within a mold comprising:

positioning the golf ball core within a mold cavity defined by opposing mold portions of the mold to leave a cavity space between the golf ball core and the mold portions at least partially surrounding the golf ball core;

injecting layer material around the golf ball core into the cavity space when the mold portions are in a partially open injection molding position; and compressing the mold portions towards each other to a compression molding position to compression mold the layer material around the golf ball core.

2. The method of claim 1, further comprising:

placing a support member against the golf ball core to hold the golf ball core in a predetermined position within the mold cavity during the injecting of the layer material; and retracting the support member from the golf ball core once sufficient layer material has been injected to maintain the golf ball core substantially in the predetermined position.

3. The method of claim 2, wherein the support member comprises a plurality of retractable pins.

4. The method of claim 2, wherein the support member is retracted before the layer material contacts the support member.

5. The method of claim 1, wherein the layer material is injected to fill at least about 40% of the cavity space before the compressing of the mold portions is commenced.

6. The method of claim 5, wherein the layer material is injected to fill at least about 80% of the cavity space before the compressing of the mold portions is commenced.

7. The method of claim 1, further comprising maintaining the mold portions at a substantially constant temperature throughout the injection and compression molding of the layer material.

8. The method of claim 1, further comprising maintaining the mold portions at a temperature below the freezing point of the layer material during the injection and compression molding of the layer material.

9. The method of claim 1, wherein the layer material is injected at a plurality of locations into the cavity space.

10. The method of claim 1, wherein the layer material is injected and compression molded to substantially completely encapsulate the golf ball core.

11. A method of molding a layer around a golf ball core within a mold, comprising:

positioning the golf ball core within a mold cavity defined by opposing mold portions of the mold to leave a cavity space between the golf ball core and the mold portions at least partially surrounding the golf ball core;

injecting layer material around the golf ball core into the cavity space;

moving the mold portions away from each other during the injection of the layer material to a partially open position to leave a vent space therebetween;

venting air through the vent space during the injection of the layer material; and compressing the mold portions towards each other to a closed position to compression mold the layer material around the golf ball core.

12. The method of claim 11, wherein the injecting of the layer material comprises injecting the layer material into the mold cavity:

(a) with the mold portions closed around the cavity in a closed injection molding position, and (b) subsequently with the mold portions in the partially open injection molding position.

13. The method of claim 11, wherein the injecting of the layer material comprises injecting the layer material to produce:

(a) a first pressure within the cavity space when the injection commences, and (b) thereafter a second pressure within the cavity space;

wherein the first pressure is insufficient to separate the mold portions and the second pressure is high enough to move the mold portions to the partially open position.

14. The method of claim 13, wherein the material is injected into the cavity from a location between the mold portions.

15. The method of claim 14, further comprising forming the opposing mold portions to comprise first and second mold halves, each defining a corresponding substantially hemispherical portion of the mold cavity and together defining a substantially spherical mold cavity.

16. The method of claim 11, further comprising:
   (a) biasing the mold portions towards each other with a first force during the injection molding;
wherein compressing of the mold portions comprises:
   (b) biasing the mold portions together with a second force that is at least about 50% greater than the first force.

17. A method of manufacturing a golf ball, comprising:
   (a) positioning at least a portion of the golf ball core within a mold cavity defined by opposing mold portions to leave a cavity space between the portion of the core and the mold portions at least partially surrounding the portion of the core;
   (b) injecting layer material into the cavity space around the portion of the core when the mold portions are in the partially open injection molding position; and
   (c) compressing the mold portions towards each other to a compression molding position to compression mold the layer material around the portion of the core.

18. The method of claim 1, wherein the layer material is injected through at least one nozzle that is maintained at a temperature above a melting temperature of the layer material during the injecting and compressing steps, and the mold portions are maintained at a different temperature below the melting temperature during the injecting and compressing steps.

19. The method of claim 1, wherein the layer material is injected into the cavity from a location between the mold portions.

20. The method of claim 17, wherein the layer material is injected into the cavity from a location between the mold portions.

* * * * *